Aug. 18, 1970 J. F. WALDORF Re. 26,936

ILLUMINATED PUSHBUTTON SWITCHES HAVING TANDEM LAMP IMPEDANCE DEVICES

Original Filed July 24, 1961 2 Sheets-Sheet 1

Inventor
Joseph F. Waldorf
By H R Ruller
Attorney

Inventor
Joseph F. Waldorf
By H. R. Ratter
Attorney

United States Patent Office

Re. 26,936

Patented Aug. 18, 1970

26,936

ILLUMINATED PUSHBUTTON SWITCHES HAVING TANDEM LAMP IMPEDANCE DEVICES

Joseph F. Waldorf, New Berlin, Wis., assignor to Cutler-Hammer, Inc., Milwaukee, Wis., a corporation of Delaware Original No. 3,231,706, dated Jan. 25, 1966, Ser. No. 126,069, July 24, 1961. Application for reissue July 17, 1967, Ser. No. 661,139

Int. Cl. H01h *9/18*

U.S. Cl. 200—167 5 Claims

Matter enclosed in heavy brackets [ ] appears in the original patent but forms no part of this reissue specification; matter printed in italics indicates the additions made by reissue.

*ABSTRACT OF THE DISCLOSURE*

*An illuminated pushbutton electrical switching apparatus including tandemly mounted pushbutton operator, illuminating apparatus including a lamp and transformer block, and contact block with reciprocating means passing through the transformer block to provide operating connection between the operator and contact block.*

*BACKGROUND OF THE INVENTION*

This invention relates generally to impedance type illuminated push button switches. A number of these systems are normally controlled from a panel on which the impedance type illuminated push buttons are mounted to provide an indication of the operational condition of each of the devices which are controlled from the panel.

In order to obtain the most efficient use of floor space these control panels must be limited in area. Illuminated push button switches presently available have a heavy duty contact block and a lamp transformer mounted on the switch in a side-by-side relation which requires a relatively large panel area.

*SUMMARY OF THE INVENTION*

The primary object of this invention is to provide an improved illuminated push button switch that occupies a minimum of space on a control panel.

This object in a preferred form is accomplished by mounting a transformer and contact block in a tandem relation on the push button assembly. Contact blocks such as shown in Nolden et al. Pat. 2,930,859 issued March 29, 1960, and owned by the assignee of this invention, are used in combination with a novel transformer. The transformer is mounted between the contact block and switch button assembly with any number of contact blocks mounted in tandem on the unit without any increase in the panel area required for the push button assembly. This reduction in the space required for the push button assemblies has made it possible to increase the number of buttons on the panel without increasing the size of the panel.

Another object of this invention is to provide a lamp transformer that automatically compensates for an overload in the circuit.

A further object is to provide an improved push button assembly that is easy to assemble and can be supplied as an independent unit.

Other objects and advantages will be apparent from the specification and claims, as will obvious modifications of the two embodiments shown in the drawings, in which:

*DESCRIPTION OF THE PREFERRED EMBODIMENT*

Figure 1:
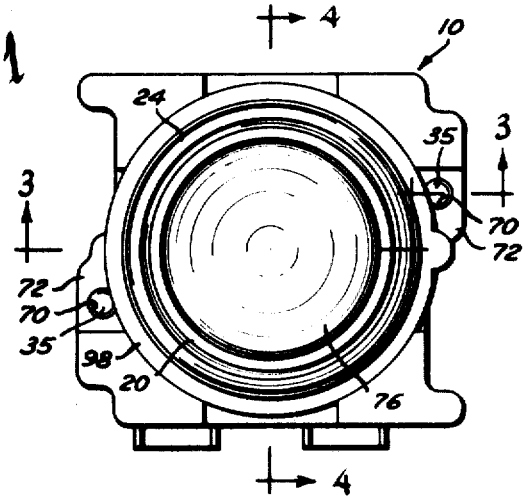
FIG. 1 is a top view of the illuminated push button switch.
Figure 2:
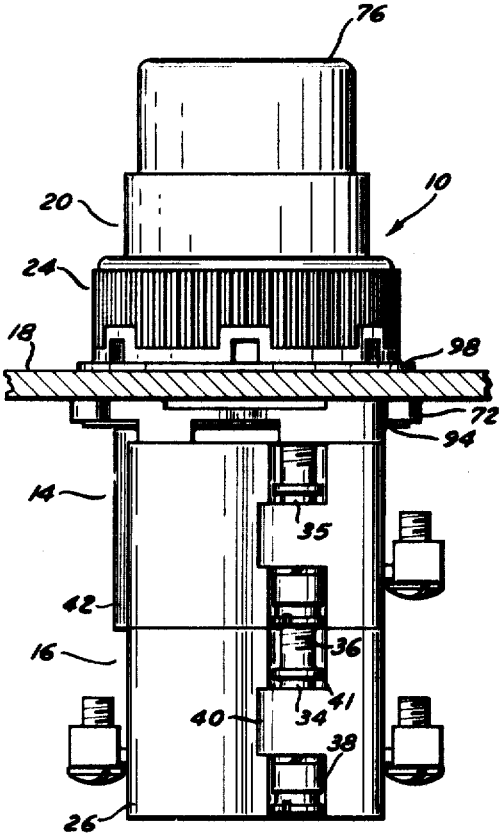
FIG. 2 is a side view of the push button switch.

Referring to the drawing, the illuminated push button switch includes a push button assembly 10 supporting a lamp transformer 14 and a heavy duty electric switch 16 in a tandem relation. The push button assembly is mounted on a panel 18 by inserting outer hollow cylindrical housing 20 through an aperture in the panel and locking the assembly to the panel by means of a clamping collar 24 threadably mounted on the cylindrical housing.

Figure 3:
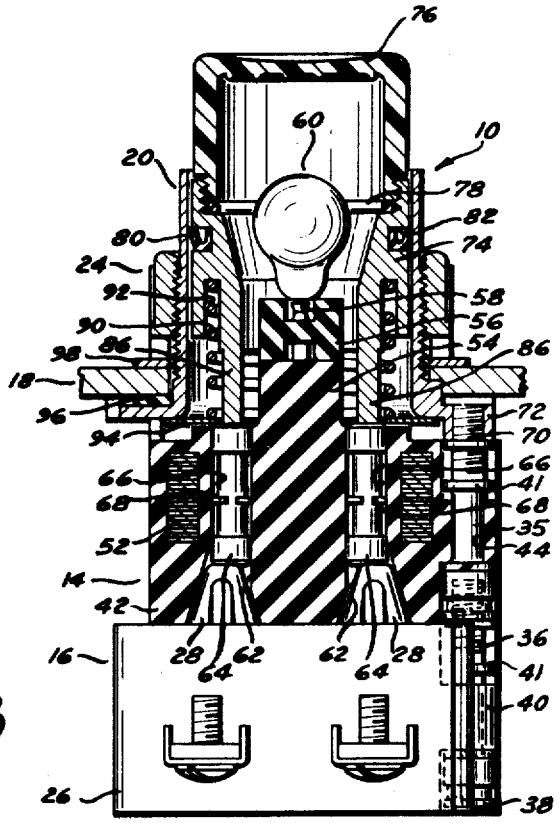
FIG. 3 is a view taken on line 3—3 of FIG. 1 showing the transformer and push button assembly.
Figure 4:
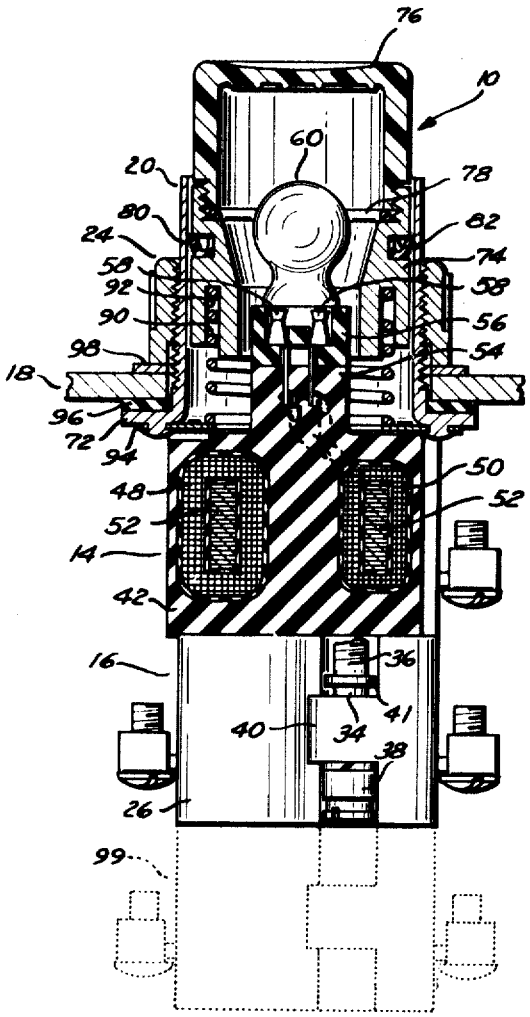
FIG. 4 is a view taken on line 4—4 of FIG. 1 showing another section of the transformer and push button assembly.
Figure 5:
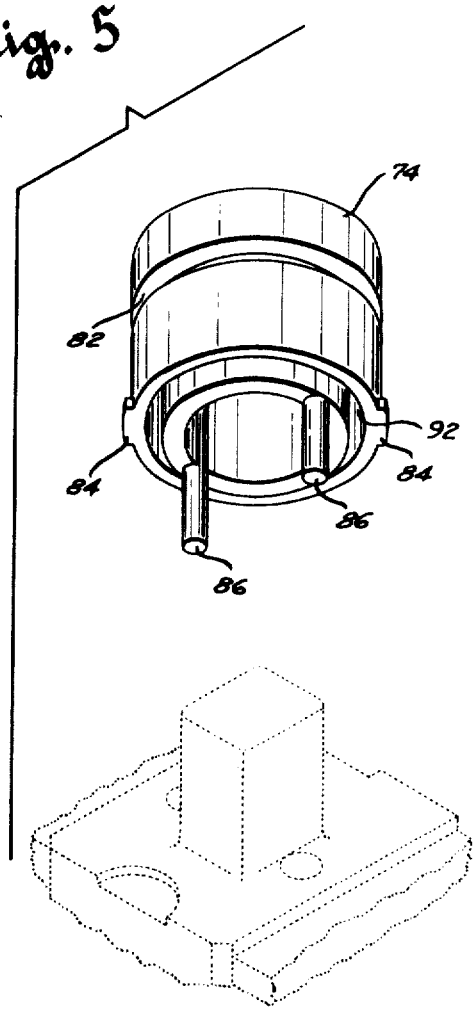
FIG. 5 is a view of the lens holder.

As shown in FIGS. 3 and 4, the electric switch is of the type described in the Nolden et al., patent with a rectangular molded housing 26 and a pair of depressible operating plungers 28 projecting above the housing. These switches may be either of the single circuit or double circuit type with the double circuit type shown in the drawings and the switches being either normally open or normally closed depending on the requirements of the particular circuit. In the present system switches [20] *30* and 32 (FIG. 6) are both normally open. Screws 34 having a threaded end 36 and a head end 38 that is kerfed, recessed and internally threaded are positioned in holes molded in section 40 on the side of the housing for securing the contact block to the transformer or to another contact block. A plastic retaining ring 41 may be provided on the screw to hold its screw on the housing when disassembled.

The transformer also has a rectangular molded housing 42 similar to the molded housing of the contact block with screws 35 provided in holes 44 molded in the housing. The transformer is of the double coil type and is molded into the housing with a primary winding 48 and a secondary winding 50 wound on a transformer frame 52. This transformer is magnetically saturated at approximately 150% of rated primary voltage overload so that the secondary voltage ceases to rise when the primary voltage is increased. This type transformer protects the [amps] *lamp* from burn-out at primary [votage overoad] *voltage overload* such as encountered when a 110 volt device is erroneously connected to a 220 volt circuit. A lamp base 54 projects outward from the transformer housing and supports a lamp socket 56 which has terminals 58 connected to the ends of the secondary winding. A pin base type lamp 60 plugs into the terminals in the lamp socket.

The contact block is secured to the transformer by threadably engaging screws 34 with the head end of screws 35. The switch actuating plungers of the contact block will project into indentations 62 in the transformer block for engagement by pusher pins 64 freely movable in holes 66 molded in the housing. Retaining rings 68 hold the pins in the housing. The transformer is secured to the outer housing 20 by threadably engaging screws 35 in threaded holes 70 in flange 72 of the outer housing. The lamp base will project into the hollow interior of the outer housing, with the top of the lamp located at approximately the same height as the outer housing.

The push button assembly includes a lens holder 74 that has a translucent plastic lens 76 threadably secured thereto and sealed by a flat washer or O-ring 78. The lens holder is reciprocally movable in the outer housing and has a resilient oil seal 80 in annular groove 82 in the side of the lens holder to slidably engage the interior surface of the outer housing. Flanges 84 on the lens holder engage grooves (not shown) at the lower end of the inner surface of the outer housing to prevent the lens holder from rotating and engage a shoulder (not shown) at the end of the groove to limit the upward travel of the lens holder in the outer housing. A pair of pins 86 extend outward from the bottom of the lens holder and are aligned with the pusher pins in the transformer. When the lens is pushed the pins will push the pusher pins against the contact block plungers to actuate the switches A compression spring 90 is positioned in groove 92 in the lens holder and acts against plate 94 united to the lens holder to bias the holder and lens in the outer position. A gasket 96 is provided between flange 72 and the panel to seal the push button switch in position. A metal washer 98 may be provided between the clamping collar and the outer surface of the panel if desired.

Figure 6:
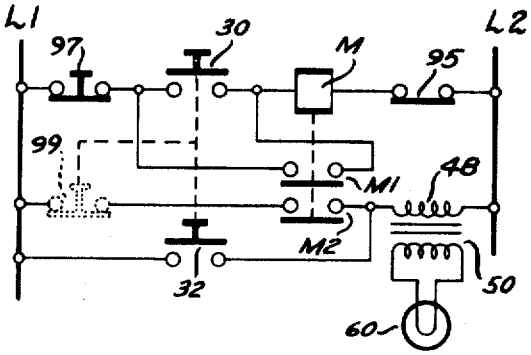
FIG. 6 is a view of one electrical circuit which can be used with the illuminated push button.

As seen in FIG. 6, the illuminated push button switch is used to control the operation of a motor starter or contactor M which is used to control the energization of an electric motor or some other electrical function (not shown). When the lens is depressed, normally open switches 30 and 32 will be closed energizing the motor starter M and the primary winding of the transformer. The lamp will light as soon as switch 32 is closed. The motor starter will close normally open relays $M_1$ and $M_2$. $M_1$ closes a holding circuit for the motor starter and $M_2$ closes a holding circuit for the primary of the transformer. When the lens is released both switches 30 and 32 will be opened and if the light goes out the relays have not been closed and the system is not operating. An overload switch 95 and a stop switch 97 are also provided in the line to deenergize the system at the end of an operating cycle.

Where a pretest system is desired a second contact block, shown dotted in FIG. 4, is added to the system with a normally closed switch 99 connected in series with relay contacts $M_2$. When the lens is pushed switches 30 and 32 will be closed and switch 99 opened. The lamp will light and the motor starter M will be energized closing the relays. The lens is released and the lamp should remain lit if the motor starter is operating. If the light should go out on the panel, the lens can be pushed to determine whether the motor starter has opened the relays or the lamp has burned out. If the latter, the lamp can be immediately replaced by merely removing the lens from the holder.

Although one embodiment of the present invention has been illustrated and described, it will be apparent to those skilled in the art that various changes and modifications may be made therein without departing from the spirit of the invention or from the scope of the appended claims.

I claim:

1. An illuminated pushbutton electric switch unit having a switch contact block with at least one reciprocable operator extending exteriorly thereof, a separate pushbutton operating assembly having a light transmitting lens, a molded insulating block immovably secured between said switch block and said operating assembly and comprising an integral portion extending into said assembly centrally thereof to which a lamp base is secured, an impedance device in said block having connection with said lamp base, terminals extending exteriorly of said block and having connection interiorly thereof with said impedance device, and means extending through an opening in said block at one side of said lamp base mounting portion affording an operating connection between said operating assembly and the operator of said switch contact block.

2. An illuminated pushbutton electric switch unit as specified in claim 1, wherein said impedance device is a transformer molded in situ in said insulating block, wherein the reciprocable operator extends into the opening which extends through said block and wherein a push pin is provided in said opening to afford an operating connection between said operating assembly and operator of said switch contact block.

3. An illuminated pushbutton electric switch as specified in claim 2, wherein said switch contact block contains at least two individual switches with individual reciprocable operators, wherein said reciprocable operators each extend into separate openings extending through said molded insulating block and wherein each such opening contains a push pin providing an individual operating connection between each switch and said pushbutton operating assembly.

*4. An assembly including a light module, a pushbutton operator, and a pushbutton switch, and comprising a module including a body having a front end and a rear end and a light socket at the front end,*

*an operator mounted on said front end of the body, and switch means mounted on the rear end of the body,*

*said body having a passage extending therethrough from front to rear,*

*a pin in said passage and movable endwise thereof and engageable at its forward end by the operator for movement endwise of the passage by the operator, and*

*means on the switch engageable with the rear end of the pin for movement thereby when the pin is moved by the operator.*

*5. A structure according to claim 4 wherein said body has a pair of parallel laterally spaced bolt accommodating passages extending therethrough from front to rear:*

*bolts in said passages having externally threaded shanks at their forward ends in threaded engagement with the operator and having internally threaded heads at their rear ends, and*

*additional bolts having externally threaded shanks at their forward ends in threaded engagement with the internally threaded heads and connecting the switch means to the rear of the body.*

References Cited

The following references, cited by the Examiner, are of record in the patented file of this patent or the original patent.

UNITED STATES PATENTS

| | | | |
|---|---|---|---|
| 2,195,947 | 4/1940 | Uhlrig | 200—167 |
| 2,234,954 | 3/1941 | Bergman | 200—167 |
| 2,591,336 | 4/1952 | Bordelon | 200—167 |
| 2,883,652 | 4/1959 | Ireland | 340—252 |
| 2,914,705 | 11/1959 | Krystyan et al. | 317—99 |
| 2,979,593 | 4/1961 | White | 200—167 |
| 3,025,432 | 3/1962 | Giegerich | 317—99 |
| 3,028,587 | 4/1962 | Vaccaro | 342—252 |
| 3,040,142 | 6/1962 | Dietrich et al. | 200—167 |

HERMAN O. JONES, Primary Examiner